(12) United States Patent
Cao et al.

(10) Patent No.: US 11,126,862 B2
(45) Date of Patent: Sep. 21, 2021

(54) DENSE CROWD COUNTING METHOD AND APPARATUS

(71) Applicant: BEIHANG UNIVERSITY, Beijing (CN)

(72) Inventors: Xianbin Cao, Beijing (CN); Xiantong Zhen, Beijing (CN); Yan Li, Beijing (CN); Lei Yue, Beijing (CN); Zehao Xiao, Beijing (CN); Yutao Hu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 101 days.

(21) Appl. No.: 16/261,428

(22) Filed: Jan. 29, 2019

(65) Prior Publication Data

US 2020/0074186 A1    Mar. 5, 2020

(30) Foreign Application Priority Data

Aug. 28, 2018   (CN) .......................... 201810986919.0

(51) Int. Cl.
  *G06K 9/00*   (2006.01)
  *G06K 9/62*   (2006.01)
  *G06N 3/08*   (2006.01)

(52) U.S. Cl.
  CPC ......... *G06K 9/00778* (2013.01); *G06K 9/629* (2013.01); *G06K 9/6232* (2013.01); *G06N 3/08* (2013.01); *G06K 9/0063* (2013.01)

(58) Field of Classification Search
  CPC .......... G06K 9/00785; G06K 9/00624; G06K 9/6232; G06K 9/6234; G06K 9/6228

(Continued)

(56) References Cited

U.S. PATENT DOCUMENTS 10,452,925 B2 * 10/2019 Yu ............................ G06K 9/66
10,453,197 B1 * 10/2019 Cholakkal ................ G06K 9/00

(Continued)

FOREIGN PATENT DOCUMENTS

| CN | 106778502 A | 5/2017 |
| CN | 107967451 A | 4/2018 |

OTHER PUBLICATIONS

Chen, Si-Qin, "Crowd counting based on fully convolutional neural network" Chinese Journal—Electronic Design Engineering; vol. 26, No. 2; (Jan. 2018); pp. 75-79; English abstract is provided.

(Continued)

*Primary Examiner* — Claire X Wang
*Assistant Examiner* — Stephen M Brinich
(74) *Attorney, Agent, or Firm* — J.C. Patents

(57) ABSTRACT

The present disclosure provides a dense crowd counting method and an apparatus, including: acquiring an image to be detected, where the image to be detected includes images of people; feeding the image to be detected into a convolutional neural network model to obtain a crowd density map of the image to be detected; and determining the number of the images of people in the image to be detected according to the crowd density map. Feature information of an image to be detected may be fully extracted through the above mentioned process, thereby realizing a better performance of crowd counting and density estimation, providing great convenience for subsequent security monitoring, crowd control and other applications.

14 Claims, 7 Drawing Sheets

(58) Field of Classification Search
USPC ......... 382/100, 103–104, 110, 115, 133, 192
See application file for complete search history.

(56) References Cited

U.S. PATENT DOCUMENTS

| | | | |
|---|---|---|---|
| 2013/0287261 A1* | 10/2013 | Lee .................... | G08G 1/0145 |
| | | | 382/104 |
| 2018/0253629 A1* | 9/2018 | Bamba ................ | G06K 9/6257 |
| 2018/0285656 A1* | 10/2018 | Yano ................... | G06T 7/246 |
| 2019/0147584 A1* | 5/2019 | Onoro-Rubio ......... | G06F 17/11 |
| | | | 382/100 |
| 2020/0008002 A1* | 1/2020 | Sahay ................. | G06K 9/6262 |

OTHER PUBLICATIONS

Yuan, Ye et al, "Research on Crowd Counting via deep Convolution Neural Networks" Chinese Journal—Group Technology & Production Modernization vol. 34, No. 2; (2017); pp. 49-53; English abstract is at p. 53.

The Chinese First Examination Report of corresponding Chinese application No. 201810986919.0, dated Feb. 3, 2020.

Second Office Action of the priority Chinese application No. 201810986919.0.

"In Defense of Single-column Networks for Crowd Counting" arXiv: 1808.06133, pp. 1-13, Aug. 2018.

* cited by examiner

DENSE CROWD COUNTING METHOD AND APPARATUS

CROSS-REFERENCE TO RELATED APPLICATIONS

This application claims priority to Chinese Patent Application No. 201810986919.0, filed on Aug. 28, 2018, which is hereby incorporated by reference in its entirety.

TECHNICAL FIELD

The present disclosure relates to the field of aerial surveillance and, more particularly, to a dense crowd counting method and an apparatus.

BACKGROUND

With the opening of low-altitude fields in recent years, drones are often used to perform tasks such as assisting disaster inspections and special condition monitoring. Among these tasks, counting and analyzing of crowd information is one of the most important parts. In many scenarios, especially in scenarios with dense crowd, calculating the number of people in the scenario and obtaining their density distribution are important for security monitoring, emergency alerting and intelligence analyzing and many other types of tasks.

In most scenarios where people counting and density estimation are required, the population intensity is relatively high, which causes severe impediments and inconsistent target scale. Early solutions generally use methods based on detection or based on regression to count the total number of people in the scenario. However, due to the severe impediments of the dense crowd and the large difference in target sizes, the detection based method is less effective. In terms of an objective function, a directly regression of the number of people in the scenario make the input domain and the output domain greatly different, which makes the objective function more difficult to fit, and can not achieve a desired result. In recent years, the density map-based method has become the mainstream of crowd counting. Such methods can not only simplify the objective function of a task, but can also obtain a more accurate crowd density distribution while counting the total number of people at the same time, thus providing a solid foundation for other subsequent applications.

There are many methods for generating a density map. Most of the methods with better effects in recent years are methods based on multi-column convolution. Multi-column convolutional neural networks with different sizes of convolution kernels are used to extract multi-scale information of original images. The obtained sets of feature maps are fused to obtain the final density map, which solves the most difficult multi-scale problems of crowd counting to some extent. However, due to the use of multiple columns of different convolutional neural networks, the parameters of the multiple columns and their extracted features are subject to a large amount of redundancy. At the same time, due to the large amount of parameters, the network has to be shallow in order to control the parameters, and the network of each branch is unable to adequately extract the corresponding information, thereby limiting the effectiveness to a certain extent.

SUMMARY

The present disclosure provides a dense crowd counting method and an apparatus, which avoid the problem of a large number of parameter redundancy in the prior art and can fully extract feature information in an image to be detected, thereby improving the performance of crowd counting and density estimation.

A first aspect of the present disclosure provides a dense crowd counting method, including:

acquiring an image to be detected, where the image to be detected includes images of people;

feeding the image to be detected into a convolutional neural network model to obtain a crowd density map of the image to be detected;

determining the number of the images of people in the image to be detected according to the crowd density map.

In one possible implementation manner, the convolutional neural network model includes a convolution module, a residual fusion module, a pooling module, and a sub-pixel module which are sequentially connected.

In one possible implementation manner, where the feeding the image to be detected into a convolutional neural network model to obtain a crowd density map of the image to be detected includes:

feeding the image to be detected into the convolution module, and preprocessing the image to be detected to obtain a first feature map;

feeding the first feature map into the residual fusion module, and performing a first multi-scale feature extraction and fusion on the first feature map to obtain a second feature map;

feeding the second feature map into the pooling module, and performing a second multi-scale feature extraction and fusion on the second feature map to obtain a third feature map; and feeding the third feature map into the sub-pixel module, and decoding the third feature map to obtain a crowd density map.

In one possible implementation manner, where the feeding the third feature map into the sub-pixel module, and decoding the third feature map to obtain a crowd density map includes:

feeding the third feature map into the sub-pixel module, and decoding the third feature map to obtain a fourth feature map; and performing a convolution on the fourth feature map, and using a bilinear interpolation algorithm to obtain a crowd density map.

In one possible implementation manner, where the determining the number of the images of people in the image to be detected according to the crowd density map includes:

performing an integration on the crowd density map to obtain the number of the images of people in the image to be detected.

In one possible implementation manner, the residual fusion module includes four nested dilated convolution layers, where the nested dilated convolution layer includes dilated convolution kernels with dilation rates of 1, 2, and 4, respectively.

In one possible implementation manner, the pooling module includes four average pooling layers.

A second aspect of the present disclosure provides a dense crowd counting apparatus, including:

an acquiring module, configured to acquire an image to be detected, where the image to be detected includes images of people;

a processing module, configured to feed the image to be detected into a convolutional neural network model to obtain a crowd density map of the image to be detected; and a determining module, configured to determine the number of the images of people in the image to be detected according to the crowd density map.

A third aspect of the present disclosure provides a dense crowd counting apparatus, including:

a memory;

a processor; and a computer program, where the computer program is stored in the memory and configured to be executed by the processor to perform the method according to any of the first aspect of the present disclosure.

A fourth aspect of the present disclosure provides a computer readable storage medium storing a computer program, where the program is executed by a processor to perform the method according to any of the first aspect of the present disclosure.

Embodiments of the present disclosure provide a dense crowd counting method and an apparatus, including: acquiring an image to be detected, where the image to be detected includes images of people; feeding the image to be detected into a convolutional neural network model to obtain a crowd density map of the image to be detected; and determining the number of the images of people in the image to be detected according to the crowd density map. Feature information of an image to be detected may be fully extracted through the above mentioned process, thereby realizing a better performance of crowd counting and density estimation, providing great convenience for subsequent security monitoring, crowd control and other applications.

BRIEF DESCRIPTION OF DRAWINGS

In order to more clearly illustrate the technical solutions of embodiments of the present disclosure or the prior art, drawings used in the description of embodiments or the prior art will be briefly described below. It is apparent that the drawings in the following description are certain embodiments of the present disclosure, and other drawings can be obtained by those skilled in the art without any creative works.

DESCRIPTION OF EMBODIMENTS

To make the objectives, technical solutions and advantages of the present disclosure more clear, the technical solutions of embodiments of the present disclosure are described in detail below with reference to the accompanying drawings. It is apparent that the described embodiments are merely a part of, rather than all, embodiments of the present disclosure. All other embodiments obtained by those skilled in the art based on the embodiments of the present disclosure without creative efforts fall within the scope of the present disclosure.

The terms "first", "second", "third" and the like in the description, claims and the above drawings of the present disclosure are used to distinguish similar objects, but are not necessarily used to describe a particular order. It should be understood that such figures may be interchangeable where appropriate, such that the embodiments of the present disclosure described herein may be implemented in an order other than those illustrated or described herein.

It should be understood that the terms "include", "comprise" and their other variations are not intended to be exhaustive. For example, a process, a method, a system, a product or an apparatus including a series of steps or units are not necessarily limited to those steps or units that are clearly listed, but may include other steps or units that are not explicitly listed or inherent to such processes, methods, products, or apparatuses.

The expression of "an embodiment" or "another embodiment" mentioned throughout the specification of the present disclosure means that a particular feature, structure or characteristic associated with the embodiment is included in at least one embodiment of the present application. Accordingly, "in an embodiment" or "in the present embodiment" is not necessarily referring to the same embodiment. It should be noted that the embodiments of the present disclosure and the features of the embodiments may be combined with each other without conflict.

The present disclosure provides a dense crowd counting method and an apparatus, realizing dense crowd counting through a method for fusing multi-scale information of a single-channel network, that is, performing multi-scale information extraction and fusion in the single-channel network, avoiding redundancy of a large number of parameters while fully extracting relevant information, thereby achieving an effective crowd counting and density estimation.

To make the above objectives, features and advantages more apparent and readily understood, the present disclosure will be described in detail below with reference to the drawings and specific embodiments.

Figure 1:
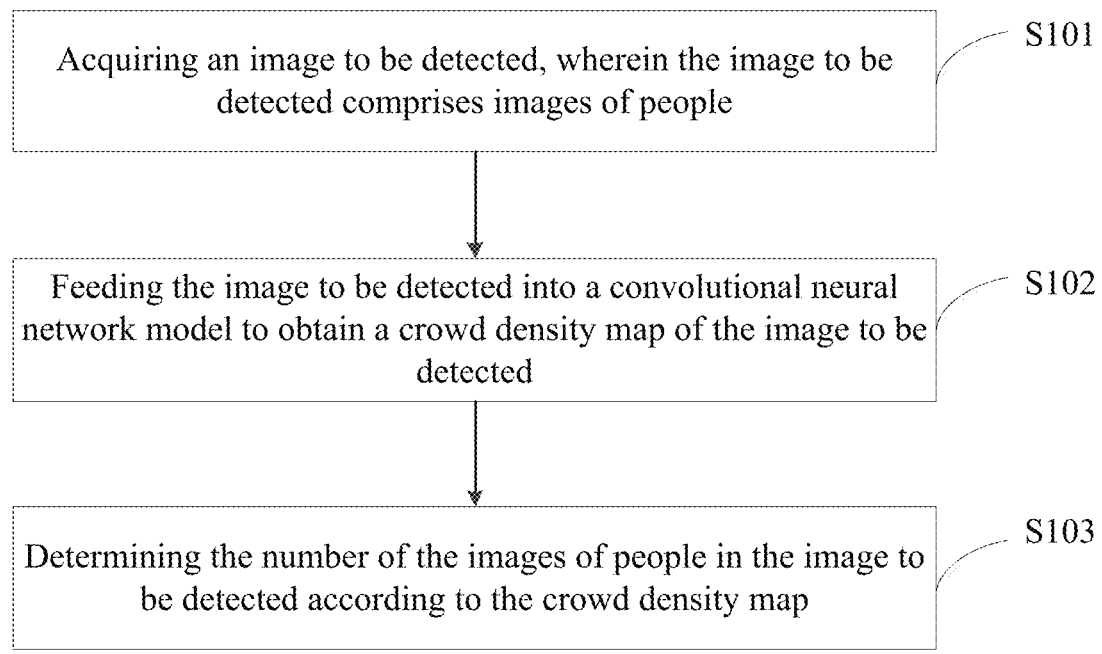
FIG. 1 is a flowchart of a dense crowd counting method according to an embodiment of the present disclosure.

FIG. 1 is a flowchart of a dense crowd counting method according to an embodiment of the present disclosure. The method may be performed by any apparatus that performs a dense crowd counting method, and the apparatus may be implemented by software and/or hardware.

As shown in FIG. 1, the dense crowd counting method according to the present embodiment includes the following steps:

S101, acquiring an image to be detected, where the image to be detected includes images of people.

In this embodiment, an image collection apparatus collects images to be detected in different test scenarios, and sends the images to be detected to a dense crowd counting apparatus. The image collecting apparatus is an aerial apparatus on an aircraft, where the aircraft includes, but is not limited to, a drone, an airplane, and a helicopter. The test scenario includes a densely crowded test scenario, and also includes a less crowded test scenario, as long as there are people shown in the test scenario, which is not limited in the embodiment.

For example, capture an image to be detected over the Tiananmen Square by a drone, where the image to be detected includes a certain number of images of people, and the sizes of the images of people in the image to be detected are different, and there are cases in which the images of people are overlapped in the image to be detected.

S102, feeding the image to be detected into a convolutional neural network model to obtain a crowd density map of the image to be detected.

In the present embodiment, the dense crowd counting apparatus is provided with a convolutional neural network model, where the convolutional neural network model is used to perform a series of image processing on the fed image to be detected to obtain the crowd density map of the image to be detected.

Figure 2:
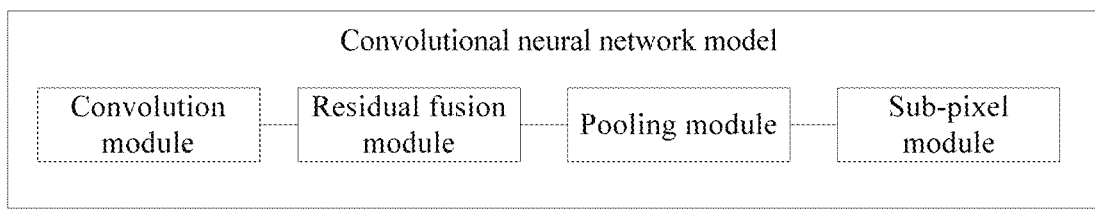
FIG. 2 is a schematic structural diagram of a convolutional neural network model according to an embodiment of the present disclosure.

FIG. 2 is a schematic structural diagram of a convolutional neural network model according to an embodiment of the present disclosure. As shown in FIG. 2, the convolutional neural network model of the embodiment includes:

A convolution module, a residual fusion module, a pooling module, and a sub-pixel module which are sequentially connected.

Where the convolution module is configured to perform pre-processing on the image to be detected, and initially reduce a spatial resolution of the image to be detected.

The residual module is configured to perform multi-scale feature extraction and fusion on the pre-processed image to be detected, such that feature information of various receptive fields in the image to be detected are extracted and combined to obtain a feature map with multi-scale information.

The pooling module is configured to perform further feature extraction and fusion on the feature map outputted by the residual module to obtain a feature map having the same size as the fed image to be detected.

The sub-pixel module is configured to decode the feature map outputted by the pooling module to obtain information of the crowd density map, and partially restore the spatial resolution of the feature map.

The dense crowd counting apparatus determines the crowd density map of the image to be detected according to the information of the crowd density map outputted by the sub-pixel module.

S103, determining the number of the images of people in the image to be detected according to the crowd density map.

In the present embodiment, the dense crowd counting apparatus performs an integration on the crowd density map according to the crowd density map determined in the above steps to obtain the number of the images of people in the image to be detected.

Embodiments of the present disclosure provide a method for counting dense crowd, including: acquiring an image to be detected, where the image to be detected includes images of people; feeding the image to be detected into a convolutional neural network model to obtain a crowd density map of the image to be detected; and determining the number of the images of people in the image to be detected according to the crowd density map. Feature information of an image to be detected may be fully extracted through the above mentioned process, thereby realizing a better performance of crowd counting and density estimation, providing great convenience for subsequent security monitoring, crowd control and other applications.

Based on the above-mentioned embodiments, the dense crowd counting method provided in this embodiment provides a detailed description of how to obtain the crowd density map of the image to be detected. The dense crowd counting method provided in this embodiment will be described below with reference to the accompanying drawings.

Figure 3:
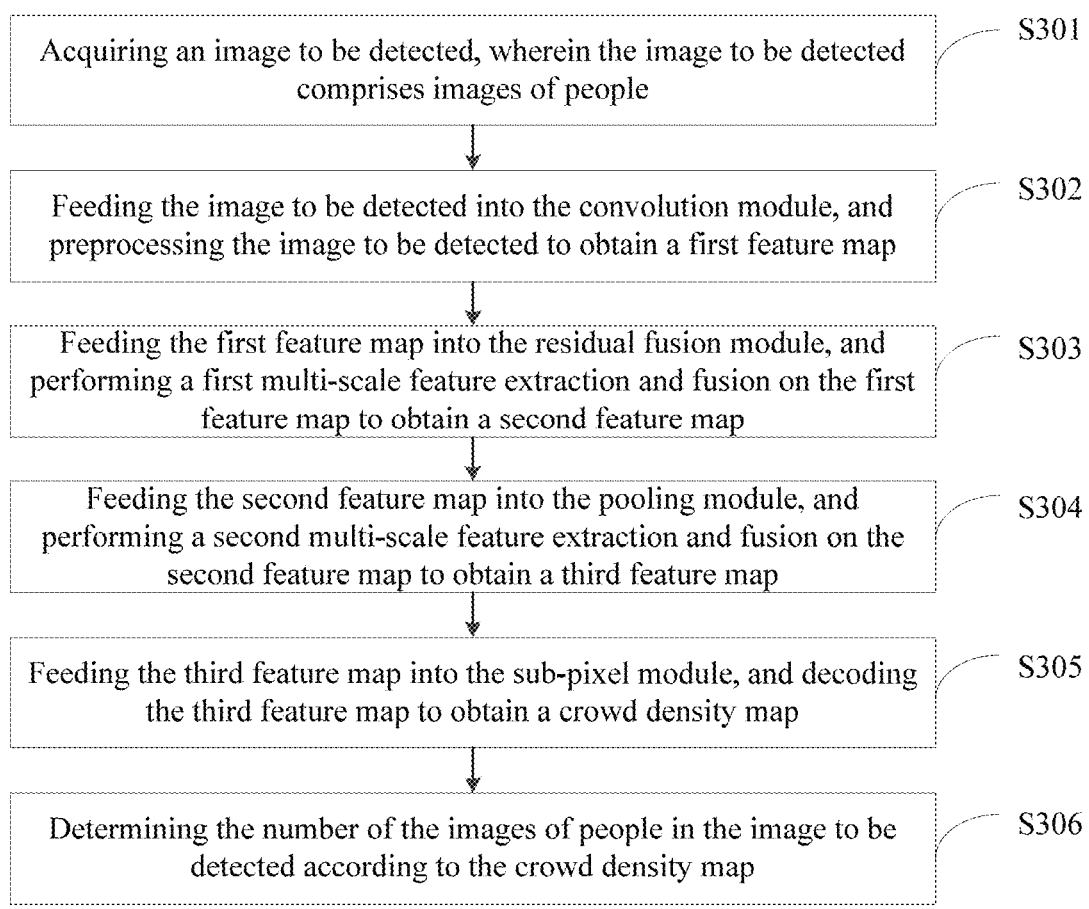
FIG. 3 is a flowchart of a dense crowd counting method according to another embodiment of the present disclosure.
Figure 4:
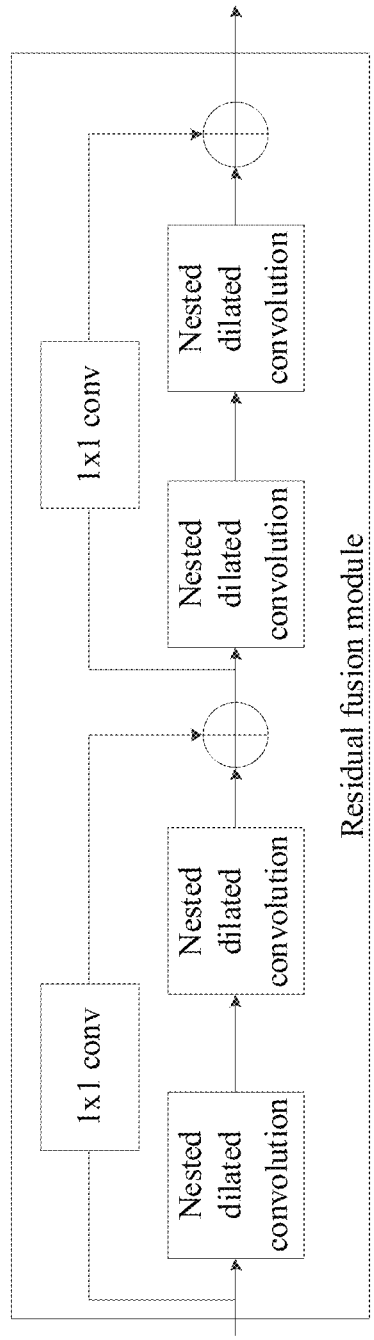
FIG. 4 is a schematic structural diagram of a residual fusion module according to an embodiment of the present disclosure.
Figure 5:
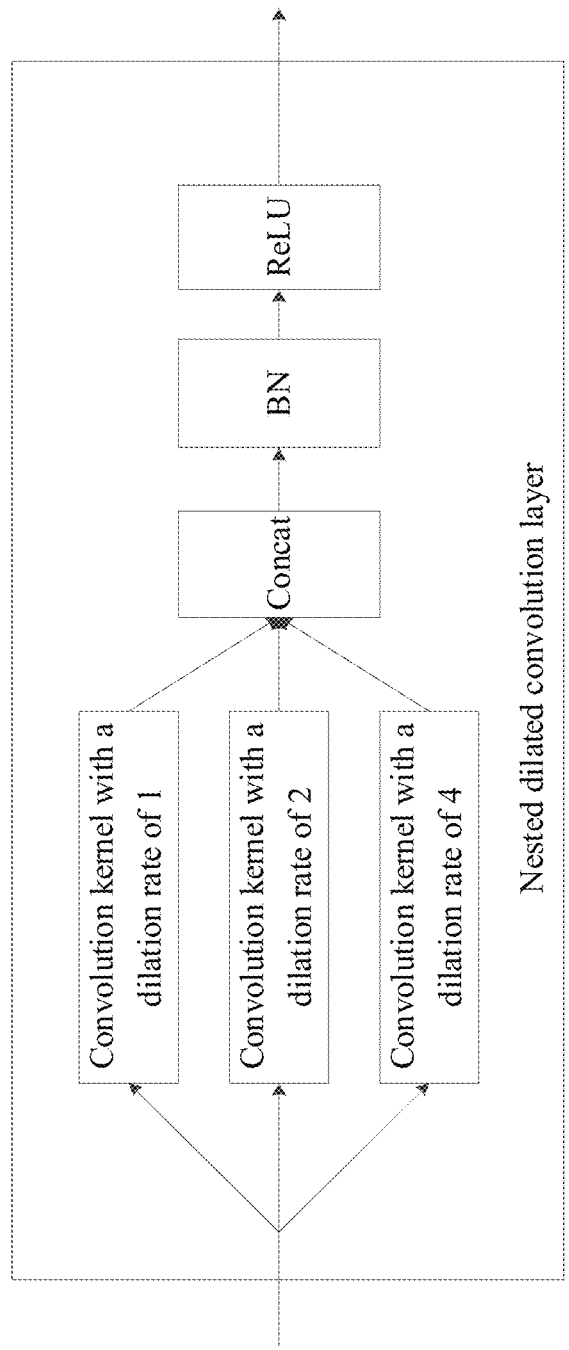
FIG. 5 is a schematic structural diagram of a nested dilated convolution layer according to an embodiment of the present disclosure.
Figure 6:
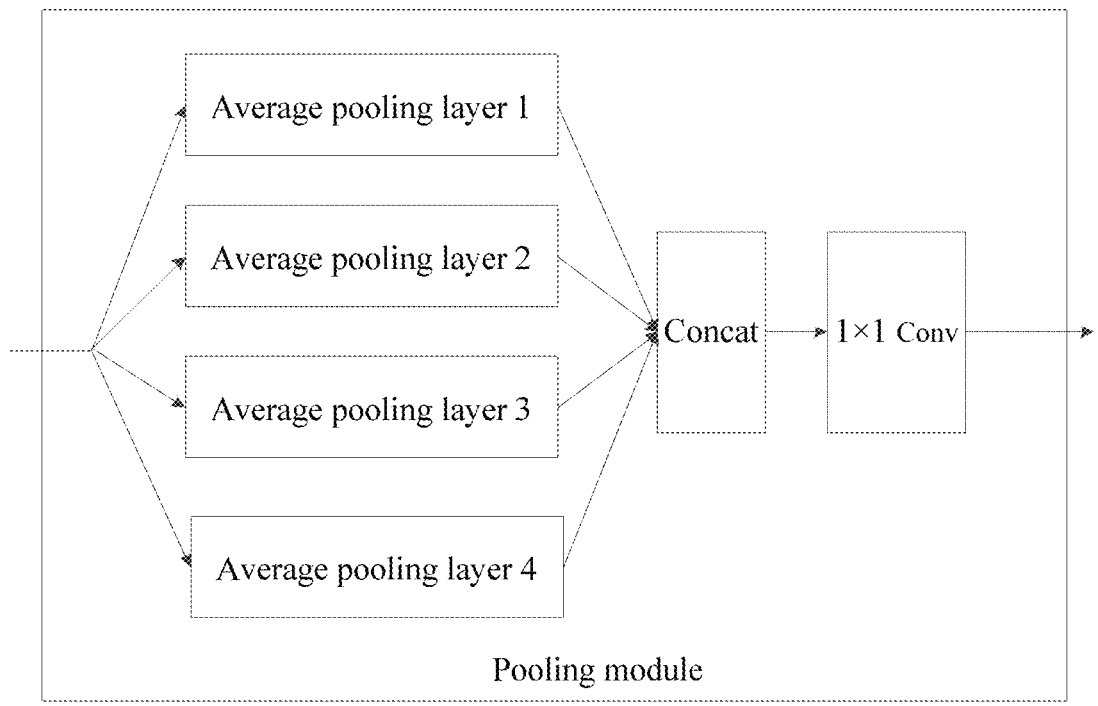
FIG. 6 is a schematic structural diagram of a pooling module according to an embodiment of the present disclosure.

FIG. 3 is a flowchart of a dense crowd counting method according to another embodiment of the present disclosure; FIG. 4 is a schematic structural diagram of a residual fusion module according to an embodiment of the present disclosure; FIG. 5 is a schematic structural diagram of a nested dilated convolution layer according to an embodiment of the present disclosure; and FIG. 6 is a schematic structural diagram of a pooling module according to an embodiment of the present disclosure.

As shown in FIG. 3, the dense crowd counting method according to the present embodiment includes the following steps:

S301, acquiring an image to be detected, where the image to be detected includes images of people.

The implementation principle and technical effects of S301 of the present embodiment is the same as those of S101 of the foregoing embodiment. Reference may be made to the above described embodiments, which are not repeated herein.

S302, feeding the image to be detected into the convolution module, and preprocessing the image to be detected to obtain a first feature map.

In this embodiment, the dense crowd counting apparatus feeds the image to be detected into the convolution module, where the convolution module uses a convolution layer with a convolution kernel size of 7×7 and a step size of 2, performs initial feature extraction on the image to be detected, and initially reduces the spatial resolution of the image to be detected.

For example, if the spatial resolution of the fed image to be detected is 512×512×3, the spatial resolution of a first feature map after pre-processing by the convolution module is 256×256×64. That is, for a fed image with three channels (RGB), the number of channels is initially three, the number of channels is changed into 64 after the pre-processing, which is equivalent to sixty-four 256×256 feature maps, where each feature map includes different feature information.

S303, feeding the first feature map into the residual fusion module, and performing a first multi-scale feature extraction and fusion on the first feature map to obtain a second feature map;

In the crowd counting problem, since the size of each image of people in the image to be detected is not uniform, an image of people with a nearer position is relatively large, and an image of people with a farther position is relatively small, it is difficult to count the number of people in the image to be detected. As a result, an extracting of multi-scale information of a target image of people in the image to be detected is crucial.

In this embodiment, the residual fusion module includes four nested dilated convolution layers, where the nested dilated convolution layer includes dilated convolution kernels with dilation rates of 1, 2, and 4, respectively. Refer to FIG. 4 for a specific structure of the residual fusion module. See FIG. 5 for a specific structure of the nested dilated convolutional layer.

As shown in FIG. 4, the residual fusion module according to the present embodiment includes four nested dilated convolution layers. Specifically, adding a first residual connection after first two nested dilated convolutional layers, that is, performing a first sum operation on a feature map after the 1×1 convolution and a feature map through the first two nested dilated convolution layers; then passing through last two nested dilated convolutional layers and adding a second residual connection, that is, performing a second sum operation on the feature map after the 1×1 convolution and a feature map through the subsequent two nested dilated convolution layers to obtain a final second feature map. The above process is a process of passing through a residual fusion module.

The residual fusion module of this embodiment includes a first residual fusion module and three second residual fusion modules. After passing through the first residual fusion module, a first feature map sequentially passes through the three second residual fusion modules. The above connection structure facilitates back propagation of gradient and reduces loss during information transfer.

All convolution layers in the first residual fusion module do not affect the size of the feature map, that is, the size of an image does not change.

The first two nested dilated convolutional layers in the second residual fusion module and the 1×1 convolutional layer in the first residual connection perform down-sampling of an image and increase the number of channels, while the remaining convolutional layers do not affect the size of the feature map. For example, the size of the fed feature map of the second residual fusion module is 256×256×64, and the size of the feature map passing through the first two nested dilated convolution layers and the first residual connection is 128×128×128, and the size of the feature map passing through the subsequent two nested dilated convolution layers and the second residual connection is still 128×128×128.

Considering the first residual fusion module and the second residual fusion modules together, it is assumed that the size of a first feature map fed to the residual fusion module is 256×256×64, and the size of the feature map passing through the first residual fusion module remains unchanged. The sizes of the feature map when sequentially passing through the three second residual fusion modules are 128×128×128, 64×64×256, and 32×32×512, respectively.

In the above processing process of a feature map, in order to further reduce the size of the feature map and extract a larger range of features, the first two nested dilated convolution layers of the last three second residual fusion modules perform down-sampling of the image while increasing its number of channels, thus avoiding a large loss of the feature information; at the same time, in order to ensure the feasibility of a residual connection, the 1×1 convolution layer in the first residual connection of the last three second residual fusion modules performs the same operation (down-sampling, and the increasing of the number of channels) on the image to ensure the consistency of the size of the feature map.

As shown in FIG. 5, the nested dilated convolution layer in the embodiment includes convolution kernels with dilation rates of 1, 2, and 4, respectively, where each dilated convolution kernel has a size of 3×3. The three dilated convolution kernels are arranged in parallel. Then the processed feature map is outputted after going through a concatenation operation, a batch normalization (BN) layer, and a rectified linear unit (ReLU) nonlinear activation layer.

Figure 7:
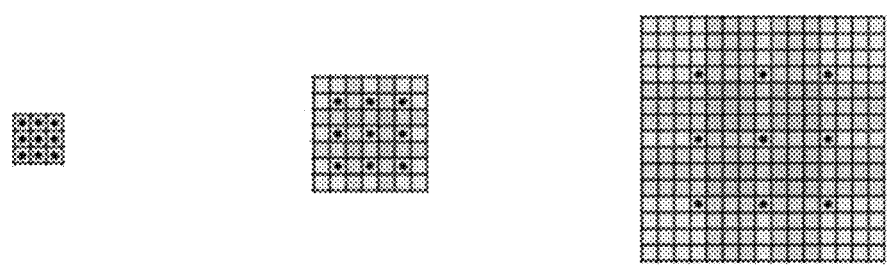
FIG. 7 is a schematic structural diagram of dilated convolution kernels with dilation rates of 1, 2, and 4 respectively according to an embodiment of the present disclosure.

A dilated convolution is obtained by expanding a convolution kernel of an ordinary convolution with the same amount of parameters, that is, maintaining original values at the center, four corners and the center of four sides of convolution kernel, while the rest are set to zero. Through adjusting the parameters of the convolution, the dilated convolution can increase the receptive field of the convolutional layer arbitrarily while keeping the values of the parameters unchanged, so as to extract the features of regions with different sizes. Illustratively, FIG. 7 is a schematic structural diagram of convolution kernels with dilation rates of 1, 2, and 4 respectively according to an embodiment of the present disclosure. The regions with black dots represent the parts with parameters in the convolution kernel, and the other regions represent "holes" in the convolution kernel.

In this embodiment, information of three receptive fields with different sizes, that is, three kinds of features in different scales may be extracted in the same convolutional layer through three different convolution kernels, where the parameters and the amount of calculation are the same as those of the ordinary convolutional layer.

S304, feeding the second feature map into the pooling module, and performing a second multi-scale feature extraction and fusion on the second feature map to obtain a third feature map.

As shown in FIG. 6, the pooling module in this embodiment includes four average pooling layers, where each of the average pooling layers uses pooling kernels of different sizes, and the four average pooling layers are arranged in parallel. And then a processed third feature map is outputted after a concatenation operation and 1×1 convolution are performed.

The pooling module in this embodiment extracts and abstracts the information of the corresponding receptive field by setting the size of a kernel. In an ordinary pooling module, the size of a pooling kernel is fixed, and only the information of the receptive field in a fixed size can be pooled, which provide less improvement on the performance of the model when the target size varies greatly.

In the present embodiment, a multi-scale pooling module is used, and feature maps are pooled by using four different sizes of pooling layers to extract and abstract the information of receptive fields in different sizes, and then the results obtained from the four pooling layers are combined by a concatenation operation, and a convolution layer with a convolution kernel size of 1 is then used for fusion and dimensionality reduction of the results. That is, further multi-scale feature extraction and fusion is realized.

By way of example, the sizes of the pooling kernel are respectively ½, ¼, ⅛, and 1/16 of an original feature map, and take a feature map with a size of 32×32×512 for example, the sizes of its pooling kernels should be 16×16, 8×8, 4×4, 2×2, respectively.

S305, feeding the third feature map into the sub-pixel module, and decoding the third feature map to obtain a crowd density map.

Specifically, feeding the third feature map into the sub-pixel module, and decoding the third feature map to obtain a fourth feature map; performing a convolution on the fourth feature map, and obtaining a crowd density map by using a bilinear interpolation algorithm.

A 1×1 convolutional layer may be used to integrate the fourth feature map, and the spatial resolution of the fourth feature map may be completely restored by using the bilinear interpolation algorithm to obtain a single channel crowd density map with the same size as the original image.

The sub-pixel module of the embodiment converts the information in a channel dimension into a spatial dimension, and replaces an original pixel point with a multi-channel concatenation, thereby realizing the decoding of the feature map without introducing any parameters, increasing a spatial dimension size and reducing a channel dimension size. After the sub-pixel module, information in a high-dimensional feature map is basically decoded into information required to generate a density map, and the resolution of the feature map is expanded by 4 times.

Figure 8:
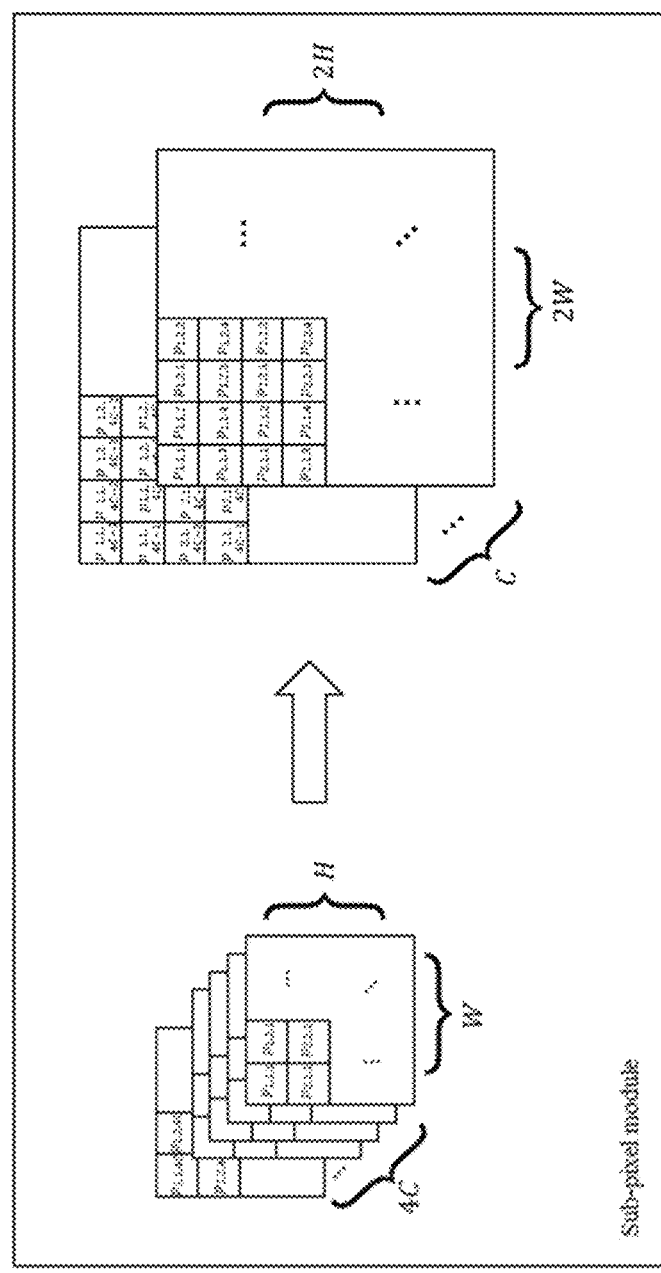
FIG. 8 is a schematic diagram of a sub-pixel module according to an embodiment of the present disclosure.

By way of example, FIG. 8 is a schematic diagram of a sub-pixel module according to an embodiment of the present disclosure. As shown in FIG. 8, values of four channels of a pixel point in a third feature map are $p_{1,1,1}$, $p_{1,1,2}$, $p_{1,1,3}$, $p_{1,1,4}$, respectively. Values of the last three channels $p_{1,1,2}$, $p_{1,1,3}$, $p_{1,1,4}$ of the pixel are filled into the places between a first pixel point $p_{1,1,1}$ and other pixel points in a first channel feature map to generate a 2×2 feature map. After performing the above operations on each pixel point in the third feature map, the expanded feature map is obtained, the spatial resolution is doubled, and the number of channels becomes ¼ of the original one.

S306, determining the number of the images of people in the image to be detected according to the crowd density map.

The implementation principle and technical effects of S306 of the present embodiment is the same as those of S103 of the foregoing embodiment. Reference may be made to the above described embodiments, which are not repeated herein.

There are many methods for generating a density map. Most of the methods with better effects in recent years are methods based on multi-column convolution. Multi-column convolutional neural networks with different sizes of convolution kernels are used to extract multi-scale information of original images. The obtained sets of feature maps are fused to obtain the final density map, which solves the most difficult multi-scale problems of crowd counting to some extent. However, due to the use of multiple columns of different convolutional neural networks, the parameters of the multiple columns and their extracted features are subject to a large amount of redundancy. At the same time, due to the large amount of parameters, the convolutional neural network has to be shallow in order to control the parameters, the convolutional neural network of each branch can not fully extract the corresponding feature information, thereby limiting the effectiveness to some extent.

An embodiment of the present disclosure provides a dense crowd counting method, including: acquiring an image to be detected, where the image to be detected includes images of people; feeding the image to be detected into a convolution module, four residual fusion modules, a pooling module, and a sub-pixel module in turn and then performing 1×1 convolution; performing a bilinear interpolation algorithm to obtain a final crowd density map; and determining the number of the images of people in the image to be detected according to the crowd density map. Feature information of the image to be detected may be fully extracted through the above mentioned process, thereby realizing a better performance of crowd counting and density estimation, providing great convenience for subsequent security monitoring, crowd control and other applications.

Figure 9:
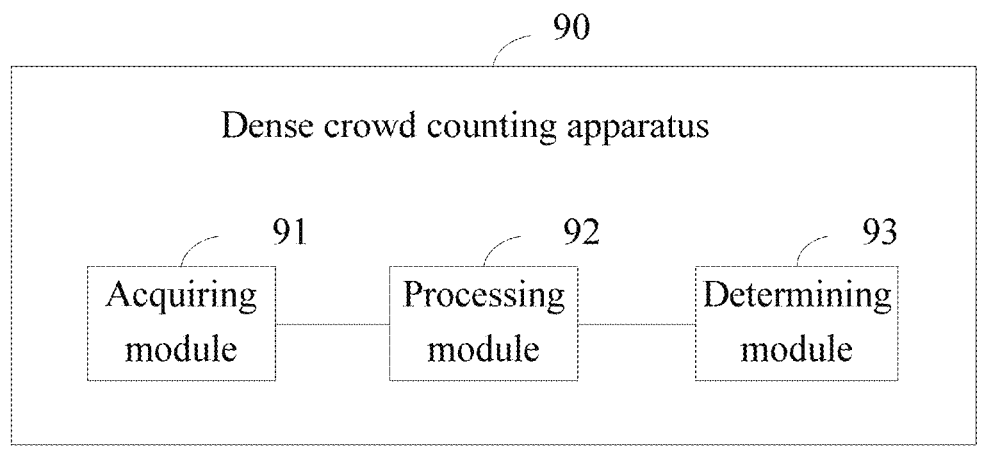
FIG. 9 is a schematic structural diagram of a dense crowd counting apparatus according to an embodiment of the present disclosure.

FIG. 9 is a schematic structural diagram of a dense crowd counting apparatus according to an embodiment of the present disclosure. As shown in FIG. 9, the dense crowd counting apparatus 90 according to the embodiment includes:

an acquiring module 91, configured to acquire an image to be detected, where the image to be detected includes images of people;

a processing module 92, configured to feed the image to be detected into a convolutional neural network model to obtain a crowd density map of the image to be detected; and a determining module 93, configured to determine the number of the images of people in the image to be detected according to the crowd density map.

In one possible implementation manner, the convolutional neural network includes a convolution module, a residual fusion module, a pooling module, and a sub-pixel module which are sequentially connected.

In one possible implementation manner, the processing module 92 is configured to:

feed the image to be detected into the convolution module, and preprocess the image to be detected to obtain a first feature map;

feed the first feature map into the residual fusion module, and perform a first multi-scale feature extraction and fusion on the first feature map to obtain a second feature map;

feed the second feature map into the pooling module, and perform a second multi-scale feature extraction and fusion on the second feature map to obtain a third feature map; and feed the third feature map into the sub-pixel module, and decode the third feature map to obtain a crowd density map.

In one possible implementation manner, where the feeding the third feature map into the sub-pixel module, and decoding the third feature map to obtain a crowd density map, includes:

feeding the third feature map into the sub-pixel module, and decoding the third feature map to obtain a fourth feature map; and performing a convolution on the fourth feature map, and using a bilinear interpolation algorithm to obtain a crowd density map.

In one possible implementation manner, where the determining the number of the images of people in the image to be detected according to the crowd density map includes:

performing an integration on the crowd density map to obtain the number of the images of people in the image to be detected.

In one possible implementation manner, the residual fusion module includes four nested dilated convolution layers, where the nested dilated convolution layer includes dilated convolution kernels with dilation rates of 1, 2, and 4, respectively.

In one possible implementation manner, the pooling module includes four average pooling layers.

The dense crowd counting apparatus according to this embodiment may perform the technical solution of the foregoing method embodiments, and the implementation principle and technical effects are similar, which are not repeated herein.

Figure 10:
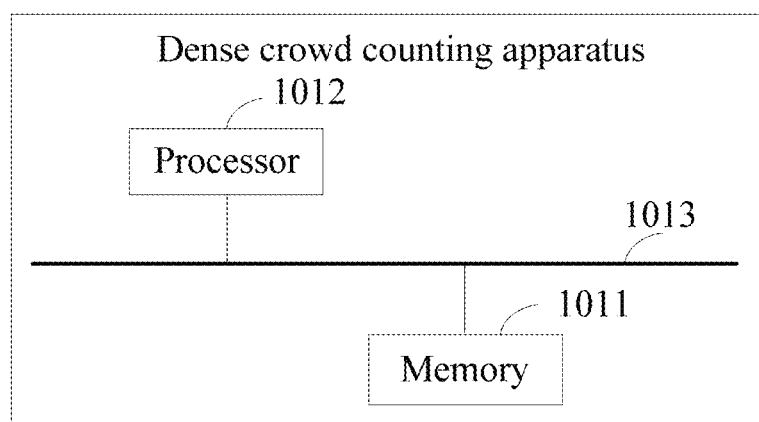
FIG. 10 is a schematic structural diagram of hardware of a dense crowd counting apparatus according to an embodiment of the present disclosure.

FIG. 10 is a schematic diagram of a hardware structure of a dense crowd counting apparatus according to an embodiment of the present disclosure. As shown in FIG. 10, the dense crowd counting apparatus according to this embodiment includes:

a memory 1011;

a processor 1012; and a computer program;

where the computer program is stored in the memory 1011, and is configured to be executed by the processor 1012 to perform a technical solution of any of the foregoing method embodiments. The implementation principle and technical effects are similar, which are not repeated herein.

Alternatively, the memory 1011 can be either independent or integrated with the processor 1012.

When the memory 1011 is independent of the processor 1012, the dense crowd counting apparatus further includes:

a bus 1013, configured to connect the memory 1011 and the processor 1012.

An embodiment of the present disclosure further provides a computer readable storage medium which stores a computer program executed by the processor 1012 to perform the steps as performed by the dense crowd counting apparatus in the above method embodiments.

It should be understood that the foregoing processor may be a central processing unit (CPU), or may be another general-purpose processor, a digital signal processor (DSP), an application specific integrated circuit (ASIC), or the like. The general-purpose processor may be a microprocessor or any conventional processor. Steps of a method according to the present disclosure may be executed by a hardware processor or by a combination of hardware and software modules within a processor.

The memory may include a high speed random-access memory (RAM) memory, and may also include a non-volatile memory NVM, for example, at least one disk storage, or may be a USB flash drive, a removable hard disk, a read only memory, a magnetic disk, or a compact disk and the like.

A bus may be an Industry Standard Architecture (ISA) bus, a Peripheral Component (PCI) bus, or an Extended Industry Standard Architecture (EISA) bus. The bus may be divided into an address bus, a data bus, a control bus and the like. For ease of representation, a bus in the drawings of the present application is not limited to only one bus or one type of bus.

The above storage medium may be implemented by any type of volatile or non-volatile storage devices or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, disk or compact disk. A storage medium may be any available medium that may be accessed by a general purpose or special purpose computer.

An exemplary storage medium is coupled to a processor to enable the processor to read information from, and write information to, the storage medium. The storage medium may also be a component of the processor. The processor and the storage medium may be located in ASIC. The processor and the storage medium may also be presented as separate components in an electronic device or a master device.

It should be noted that the above embodiments are merely used to illustrate the technical solution of the present disclosure, but not limited thereto. Although the present disclosure has been described in detail with reference to the foregoing various embodiments, it should be understood by a person skilled in the art that modifications and equivalent substitutions can be made on the technical schemes of the present disclosure without departing from the scope of the present disclosure.

What is claimed is:

1. A dense crowd counting method, comprising:
   acquiring an image to be detected, wherein the image to be detected comprises images of people;
   feeding the image to be detected into a convolutional neural network model to obtain a crowd density map of the image to be detected, wherein the convolutional neural network model comprises a convolution module, a residual fusion module, a pooling module, and a sub-pixel module which are sequentially connected, wherein the convolution module is configured to obtain a first feature map; and
   determining a number of the images of people in the image to be detected according to the crowd density map;
   wherein the residual fusion module comprises a first residual fusion module and a second residual fusion module, and the first feature map passes through the second residual fusion module after passing through the first residual fusion module, wherein the first residual fusion module performs processing on the first feature map without changing a size of the first feature map, and the second residual fusion module performs down-sampling on the processing result from the first residual fusion module.

2. The method according to claim 1, wherein the feeding the image to be detected into a convolutional neural network model to obtain a crowd density map of the image to be detected comprises:
   feeding the image to be detected into the convolution module, and preprocessing the image to be detected to obtain the first feature map;
   feeding the first feature map into the residual fusion module, and performing a first multi-scale feature extraction and fusion on the first feature map to obtain a second feature map;
   feeding the second feature map into the pooling module, and performing a second multi-scale feature extraction and fusion on the second feature map to obtain a third feature map; and
   feeding the third feature map into the sub-pixel module, and decoding the third feature map to obtain the crowd density map.

3. The method according to claim 2, wherein the feeding the third feature map into the sub-pixel module, and decoding the third feature map to obtain the crowd density map, comprises:
   feeding the third feature map into the sub-pixel module, and decoding the third feature map to obtain a fourth feature map; and
   performing a convolution on the fourth feature map, and using a bilinear interpolation algorithm to obtain the crowd density map.

4. The method according to claim 1, wherein the determining a number of the images of people in the image to be detected according to the crowd density map comprises:
   performing an integration on the crowd density map to obtain the number of the images of people in the image to be detected.

5. The method according to claim 1, wherein each of the first residual fusion module and the second residual fusion module comprises four nested dilated convolution layers, respectively, wherein the nested dilated convolution layer comprises dilated convolution kernels with dilation rates of 1, 2, and 4, respectively.

6. The method according to claim 1, wherein the pooling module comprises four average pooling layers.

7. A dense crowd counting apparatus, comprising:
a memory;
a processor; and
a computer program, wherein the computer program is stored in the memory and configured to be executed by the processor to perform:
acquiring an image to be detected, wherein the image to be detected comprises images of people;
feeding the image to be detected into a convolutional neural network model to obtain a crowd density map of the image to be detected, wherein the convolutional neural network model comprises a convolution module, a residual fusion module, a pooling module, and a sub-pixel module which are sequentially connected, wherein the convolution module is configured to obtain a first feature map; and
determining a number of the images of people in the image to be detected according to the crowd density map;
wherein the residual fusion module comprises a first residual fusion module and a second residual fusion module, and the first feature map passes through the second residual fusion module after passing through the first residual fusion module, wherein the first residual fusion module performs processing on the first feature map without changing a size of the first feature map, and the second residual fusion module performs down-sampling on the processing result from the first residual fusion module.

8. The apparatus according to claim 7, wherein the processor is configured to:
feed the image to be detected into the convolution module, and preprocess the image to be detected to obtain the first feature map;
feed the first feature map into the residual fusion module, and perform a first multi-scale feature extraction and fusion on the first feature map to obtain a second feature map;
feed the second feature map into the pooling module, and perform a second multi-scale feature extraction and fusion on the second feature map to obtain a third feature map; and
feed the third feature map into the sub-pixel module, and decode the third feature map to obtain the crowd density map.

9. The apparatus according to claim 8, wherein the processor is configured to:
feed the third feature map into the sub-pixel module, and decode the third feature map to obtain a fourth feature map; and
perform a convolution on the fourth feature map, and use a bilinear interpolation algorithm to obtain the crowd density map.

10. The apparatus according to claim 7, wherein the processor is further configured to:
perform an integration on the crowd density map to obtain the number of the images of people in the image to be detected.

11. The apparatus according to claim 7, wherein each of the first residual fusion module and the second residual fusion module comprises four nested dilated convolution layers, respectively, wherein the nested dilated convolution layer comprises dilated convolution kernels with dilation rates of 1, 2, and 4, respectively.

12. The apparatus according to claim 7, wherein the pooling module comprises four average pooling layers.

13. A computer readable storage medium storing a computer program, wherein the program is executed by a processor to perform the method according to claim 1.

14. The method according to claim 1, wherein the second residual fusion module comprises an operation of increasing the number of channels for the image.

* * * * *